United States Patent
Urban et al.

(10) Patent No.: US 10,508,220 B2
(45) Date of Patent: Dec. 17, 2019

(54) SLURRY COMPOSITION AND ADDITIVES AND METHOD FOR POLISHING ORGANIC POLYMER-BASED OPHTHALMIC SUBSTRATES

(71) Applicant: Ferro Corporation, Mayfield Heights, OH (US)

(72) Inventors: Nathaniel D. Urban, Canandaigua, NY (US); Edward E. Abbott, Tucson, AZ (US); Yue Liu, Marietta, GA (US)

(73) Assignee: Ferro Corporation, Mayfield Heights, OH (US)

( * ) Notice: Subject to any disclaimer, the term of this patent is extended or adjusted under 35 U.S.C. 154(b) by 183 days.

(21) Appl. No.: 15/567,642

(22) PCT Filed: Jun. 13, 2016

(86) PCT No.: PCT/US2016/037140
§ 371 (c)(1),
(2) Date: Oct. 19, 2017

(87) PCT Pub. No.: WO2017/011115
PCT Pub. Date: Jan. 19, 2017

(65) Prior Publication Data
US 2018/0118977 A1 May 3, 2018

Related U.S. Application Data

(60) Provisional application No. 62/190,841, filed on Jul. 10, 2015.

(51) Int. Cl.
*B24B 13/00* (2006.01)
*C09G 1/02* (2006.01)
*B24B 37/24* (2012.01)
*G02B 1/04* (2006.01)

(52) U.S. Cl.
CPC ............... *C09G 1/02* (2013.01); *B24B 13/00* (2013.01); *B24B 37/24* (2013.01); *G02B 1/041* (2013.01)

(58) Field of Classification Search
CPC ......... C09G 1/02; B24B 13/00; B24B 37/044; B24B 37/24; G02B 1/041
USPC .......................................................... 451/28
See application file for complete search history.

(56) References Cited

U.S. PATENT DOCUMENTS

| | | | |
|---|---|---|---|
| 4,222,747 A | 9/1980 | Dauguet et al. | |
| 4,225,349 A * | 9/1980 | Koshiyama | C09G 1/02 106/3 |
| 4,915,710 A * | 4/1990 | Miyazaki | B24D 3/00 106/3 |
| 4,935,039 A * | 6/1990 | Miyazaki | C09K 3/1463 106/3 |
| 5,868,604 A * | 2/1999 | Atsugi | C09K 3/1463 106/1.05 |
| 6,306,012 B1 * | 10/2001 | Sabde | B24B 21/04 451/41 |
| 6,491,843 B1 | 12/2002 | Srinivasan et al. | |
| 6,508,953 B1 | 1/2003 | Li et al. | |
| 6,596,042 B1 | 7/2003 | Feng et al. | |
| 6,616,514 B1 | 9/2003 | Edelbach et al. | |
| 6,660,639 B2 | 12/2003 | Li et al. | |
| 6,702,954 B1 | 3/2004 | Her et al. | |
| 6,818,030 B2 | 11/2004 | Feng et al. | |
| 7,091,164 B2 | 8/2006 | Srinivasan et al. | |
| 7,101,800 B2 | 9/2006 | Her et al. | |
| 7,294,044 B2 | 11/2007 | Ferranti | |
| 7,300,478 B2 | 11/2007 | Ferranti et al. | |
| 7,666,239 B2 | 2/2010 | Feng et al. | |
| 7,687,401 B2 | 3/2010 | Feng et al. | |
| 7,708,788 B2 | 5/2010 | Yoshida et al. | |
| 8,409,990 B2 | 4/2013 | Kraft | |
| 2005/0194358 A1 * | 9/2005 | Chelle | B24B 37/044 216/88 |
| 2006/0228999 A1 * | 10/2006 | Ferranti | B24B 13/00 451/41 |
| 2007/0190910 A1 * | 8/2007 | Ferranti | B24B 13/00 451/41 |
| 2009/0011599 A1 * | 1/2009 | Lee | C09G 1/02 438/693 |
| 2010/0330884 A1 * | 12/2010 | Liu | B24B 1/00 451/42 |
| 2011/0039475 A1 * | 2/2011 | Hoshi | B24B 37/044 451/28 |
| 2014/0263170 A1 * | 9/2014 | Long | C09G 1/02 216/38 |
| 2016/0013066 A1 * | 1/2016 | Noller | B24B 37/044 438/693 |
| 2017/0204293 A1 | 7/2017 | Megherhi et al. | |

FOREIGN PATENT DOCUMENTS

| | | |
|---|---|---|
| CN | 103805069 A | 5/2014 |
| WO | 2010/087849 A1 | 8/2010 |

OTHER PUBLICATIONS

Espacenet bibliographic data for CN103805069 published 21 May 2014, one page.
International Search Report for corresponding PCT/US2016/037140 dated Sep. 15, 2016, one page.

* cited by examiner

*Primary Examiner* — George B Nguyen
(74) *Attorney, Agent, or Firm* — Rankin, Hill & Clark LLP

(57) ABSTRACT

The present invention provides a slurry composition and method for polishing organic polymer-based ophthalmic substrates. The slurry composition according to the invention includes an aqueous dispersion of abrasive particles and one of a polyvinyl alcohol compound, and a tertiary amide functionalized compound. The abrasive particles can be alumina, zirconia, silica, titania, ceria, spinel or combinations of the foregoing.

20 Claims, No Drawings

SLURRY COMPOSITION AND ADDITIVES AND METHOD FOR POLISHING ORGANIC POLYMER-BASED OPHTHALMIC SUBSTRATES

BACKGROUND OF THE INVENTION

1. Field of Invention

The present invention relates to a slurry composition and method for polishing organic polymer-based ophthalmic substrates.

2. Description of Related Art

A variety of slurry compositions are known in the art for use in polishing organic polymer-based ophthalmic substrates. Such prior art slurry compositions generally consist of abrasive particles dispersed in water and/or other liquids. Commonly utilized abrasive particles include, for example, cerium oxide, aluminum oxide, zirconium oxide, tin oxide, silicon dioxide and titanium oxide. Aluminum oxide slurry is most commonly used for polishing organic polymer-based ophthalmic substrates such as, for example, allyl diglycol carbonate polymer, which is commonly known in the art as CR-39, and other higher index of refraction polycarbonate resins.

Slurry compositions consisting solely of aluminum oxide abrasive particles dispersed in water produce acceptable surface quality when used to polish organic polymer-based ophthalmic substrates, but exhibit unacceptably low polishing efficiency (i.e., a low removal rate). The polishing efficiency of such slurry compositions can be improved by using significantly larger aluminum oxide particles, but this results in unsatisfactory surface quality, i.e. scratches, pit marks, orange peel or similar defects.

Koshiyama et al., U.S. Pat. No. 4,225,349, disclose a polishing composition consisting of calcined alumina (aluminum oxide particles) and an aluminum salt polishing accelerator dispersed in deionized water that accelerates the removal of the CR-39 substrate material without degrading the surface quality. The preferred polishing accelerator identified by Koshiyama et al. is aluminum nitrate.

CR-39, which has an index of refraction ("RI") of about 1.498, has dominated the market for organic polymer-based ophthalmic substrates for many years. In recent years, however, higher index of refraction organic polymer-based ophthalmic substrates have been developed, and these higher index of refraction substrates are becoming more prevalent in the ophthalmic lens market. The higher index of refraction substrates provide several distinct advantages over CR-39 in ophthalmic lens applications. For example, lenses that are fabricated from RI 1.586 polycarbonate substrates are thinner and lighter in weight than comparable lenses fabricated from CR-39, and further provide improved impact resistance. This makes higher index organic polymer-based ophthalmic substrates more suitable for use in fabricating eyewear worn by children, active adults and in the production of safety glasses. Generally speaking, the higher the index of refraction, the thinner and lighter the ophthalmic lens. Higher index of refraction organic polymer-based ophthalmic substrates allow for the fabrication of eyewear that is functional and fashionable, and which eliminates the "bulbous" or thick "coke-bottle" look often found with lower index of refraction lenses.

Known slurry compositions for use in polishing CR-39 do not provide the desired polishing efficiency, even when a conventional accelerator such as aluminum nitrate is present. A slurry composition that provides high removal efficiency, particularly on higher index of refraction organic polymer-based ophthalmic substrates, is desired.

BRIEF SUMMARY OF THE INVENTION

The present invention provides a slurry composition and method for polishing organic polymer-based ophthalmic substrates. The slurry composition and method of the invention polishes high index polymer-based ophthalmic substrates with greater polishing efficiency and surface quality than can be achieved with conventional slurry compositions. A slurry composition according to the invention comprises an aqueous dispersion of abrasive particles and at least one of polyvinyl alcohol, polyvinyl alcohol-containing compound and a compound that hydrolyzes to form polyvinyl alcohol. Any of the foregoing may be termed "polyvinyl alcohol compounds." Another slurry composition according to the invention comprises an aqueous dispersion of abrasive particles and polymers or small molecular weight compounds containing a tertiary amide functional group. The abrasive particles can be alumina, zirconia, silica, titania or combinations of the foregoing. Slurry compositions according to the invention can be used to polish all types of organic polymer-based ophthalmic substrates, but are particularly useful for polishing organic polymer-based ophthalmic substrates having an index of refraction greater than 1.498 because they remove such materials at a greater efficiency than conventional slurry compositions without detrimentally affecting the quality of the resulting surface.

An embodiment of the invention is a polishing slurry including a dispersible polyvinyl alcohol compound additive to polishing slurry to improve the rate at which ophthalmic substrate material is removed during a polishing process.

An embodiment of the invention is a polishing slurry including a dispersible additive which is a polymeric or other small molecular weight compound containing a tertiary amide functional group to improve the rate at which ophthalmic substrate material is removed during a polishing process. Representative but non-limiting examples include poly 2-ethyloxazoline (Aquazol®), poly (N,N-dimethylacrylamide), poly (N-methyl N-vinyl acetamide), N-methylcaprolactam, and N-methyl-2-piperidone. Aquazol® is available from Polymer Chemistry Innovations, Inc., of Tucson, Ariz. Also suitable are N-methyl-2-pyridone, and poly(2-ethyl-2-oxazoline).

Not included in the scope of this invention, and specifically disclaimed herein are compositions of the pyrrolidone class, polyvinyl caprolactam, and those claimed in U.S. Pat. No. 7,467,988. However, such compositions may be used together with the inventive compositions herein.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

Throughout the instant specification and in the appended claims, the phrase "organic polymer-based ophthalmic substrates" refers to organic thermosetting or thermoplastic polymer materials used in the fabrication of eyeglass lenses and other optometric devices. Included within this definition are polycarbonate materials such as allyl diglycol carbonate polymers commonly known as CR-39 and other thermosetting and thermoplastic organic polymer resins used to fabricate ophthalmic lenses. Specifically excluded from this definition are inorganic glasses and inorganic crystal based substrates. The phrase "high index organic polymer-based ophthalmic substrates" refers to those organic polymer-based ophthalmic substrates that have an index of refraction greater than 1.498, which is the index of refraction for the allyl diglycol carbonate polymer known in the art as CR-39. Most manufacturers of organic polymer-based ophthalmic substrates regard the specific composition of their ophthalmic substrate materials as proprietary information. Applicants do not have knowledge of the specific compositions of such materials, but generally know that such substrates belong to polymer families such as polycarbonates, polyurethanes, polyacrylates and polysulfones. These organic polymer families may be homopolymers or copolymers, and most are cross-linked and/or co-polymerized with other organic and inorganic compounds. Most are thermocast.

Slurry compositions according to the present invention can be used to polish all organic polymer-based ophthalmic substrates, but are particularly suitable for use in polishing high index organic polymer-based ophthalmic substrates. As shown in the accompanying Examples, slurry compositions according to the invention provide greater polishing efficiency on high index organic polymer-based ophthalmic substrates than convention slurry compositions. Furthermore, slurry compositions according to the invention provide similar, if not improved, polishing efficiencies on traditional polycarbonate materials such as CR-39. In all applications, slurry compositions according to the invention provide acceptable surface quality.

This invention provides additional routes to achieve rate acceleration of an ophthalmic polishing slurry using a new chemical family than those currently used in the field. Additional chemistry allows for greater variety in slurry properties such as viscosity, ease of cleaning, etc. for use with varied polishing equipment.

Slurry compositions according to the present invention comprise an aqueous dispersion comprising abrasive particles and at least one selected from the group consisting of (a) a polyvinyl alcohol compound and a (b) tertiary amide compound, and combinations thereof. The abrasive particles must be selected from the group consisting of alumina, zirconia, silica, titania and combinations of the foregoing. It will be appreciated that the abrasive particles can be doped with or contain small amounts of other elements. Abrasives are typically produced by high temperature calcination, but can be produced by other methods. Calcined alumina abrasive particles are presently most preferred for use in the invention.

The abrasive particles used in the invention, which may be alumina, may have a particle size within the range of from about 0.01 to 5 µm, preferably about 0.5 µm to about 4.0 µm, and more preferably within the range of from about 1.5 µm to about 2.5 µm. The slurry composition comprises from about 5% to about 40% of the by weight, and more preferably within the range of from about 10% to about 30% of the abrasive particles by weight.

Polyvinyl Alcohol Additive. Polyvinyl alcohol is typically formed from the hydrolysis of polyvinyl acetate. There is no restriction as to the extent of hydrolysis of the polyvinyl acetate. Additionally, any compound that can be hydrolyzed to polyvinyl alcohol can be used in place of polyvinyl alcohol. Non-limiting examples of such compounds include polyvinyl formate, polyvinyl benzoate, polyvinyl stearate, polyvinyl chloroacetate, polyvinyl fluoroacetate, and polyvinyl propionate. Combinations of the foregoing are possible also. The compounds in this paragraph may be termed "polyvinyl alcohol compounds."

Polyvinyl alcohol can be synthetically made in a variety of different molecular weights. There is no restriction as to the molecular weight of the polymer.

Co-polymers of polyvinyl alcohol can be used. These polymers may have additional chemical functional groups pendent to the polyvinyl alcohol backbone. There is no restriction on the identity of these chemical groups.

There is no restriction as to the chemical termination of the polyvinyl alcohol. It is common for polyvinyl alcohol to be chemically functionalized to provide additional properties, particularly borate termination for use with paper and wood products. Polyvinyl alcohol for use as an additive could be terminated in any chemical end groups such as borates, phosphates, sulfates, aldehydes and acetates.

The polyvinyl alcohol may have a weight average molecular weight of from about 1,000 to about 300,000, preferably from about 1,500 to 200,000, more preferably from about 2,000 to 100,000, and still more preferably from about 5,000 to about 75,000. All values in between are also envisioned.

The slurry composition comprises from about 0.01% to about 10%, preferably from about 0.025% to about 5% and more preferably from about 0.15% to about 4% of the polyvinyl alcohol compound by weight.

Tertiary Amide Functionalized Compound. An embodiment of the invention is a polishing slurry including a dispersible additive which is a polymeric or other small molecular weight compound containing a tertiary amide functional group to improve the rate at which ophthalmic substrate material is removed during a polishing process. The soluble additives can include without limitation poly 2-ethyloxazoline (Aquazol®), poly (N,N-dimethylacrylamide), poly (N-methyl N-vinyl acetamide), N-methylcaprolactam, and N-methyl-2-piperidone. Aquazol® is available from Polymer Chemistry Innovations, Inc., of Tucson, Ariz. Aquazol® 50, Aquazol® 200 and Aquazol® 500 have molecular weights of 50,000, 200,000 and 500,000 respectively. However other molecular weight products are also suitable, for example in the range of 10,000 to 1,000,000, preferably 25,000 to 750,000, more preferably 50,000 to 500,000 and still more preferably 75,000 to 400,000. All values in between are also envisioned.

The slurry composition comprises from about 0.01% to about 10%, preferably 0.025% to about 5% and more preferably from about 0.15% to about 4% of the tertiary amide containing compound by weight.

Aluminum nitrate is a known polishing efficiency accelerator for use on various ophthalmic substrates. Aluminum nitrate can be used in slurry compositions according to the invention without adversely degrading the efficiency improvements provided on high index organic polymer-based ophthalmic substrates. When aluminum nitrate is used in a slurry composition according to the invention, it is present in an amount preferably within the range of from about 0.25% to 4.0% by weight, and more preferably from about 0.5% to about 3.0% by weight.

As is well known in the art, colloidal aluminum hydroxide can be used as a suspending agent for alumina abrasive particles. When colloidal aluminum hydroxide is present, the slurry composition comprises from about 0.5% to about 5% and preferably, 0.735% to about 4% of colloidal aluminum hydroxide by weight.

Preferably, an anti-foaming agent (also called defoamer) such as modified siloxane treated fumed silica is also used.

Anti-foaming agents of this type are well known in the art, and can be acquired from a variety of vendors. Anti-foaming agents are typically present in an amount from about 0.01% to about 0.30% by weight, and more preferably from about 0.025% to about 0.10% by weight.

The slurry composition according to the present invention is preferably aqueous in nature, meaning that the individual components of the slurry are dispersed in water, preferably deionized water. However, other liquid polishing media can be used It will be appreciated that surfactants, biocides, pH modifiers, pH buffers, rheology modifiers and other compounds can also be present in the slurry composition provided they do not adversely react with the abrasive particles and/or the additive compositions (polyvinyl alcohol, tertiary amide functionalized compound) and thereby do not adversely affect the efficiency of the polishing slurry, or do not detrimentally affect the final surface quality produced via polishing.

The following examples are intended only to illustrate the invention and should not be construed as imposing limitations upon the claims.

EXAMPLES

In the following examples, unless otherwise stated, the term "Alumina" refers to calcined aluminum oxide having an average particle size of about 1.0 µm to about 2.5 µm. The term "Aluminum Hydroxide" refers to colloidal aluminum hydroxide (~90 nm Boehmite). The term "Aluminum Nitrate" refers to a 60% (by weight) solution of aluminum nitrate dissolved in water.

The organic polymer-based ophthalmic substrates tested in the following examples are referred to by their refractive index. The specific compositions of the organic polymer-based ophthalmic substrates are regarded as proprietary by the manufacturers, and are not known by applicant. The term "CR-39" refers to an organic polymer-based ophthalmic substrate (believed to comprise an allyl diglycol carbonate polymer), having a refractive index of 1.498, which can be obtained from Essilor of America, Inc. of Petersburg, Fla. The term "polycarbonate" refers to an organic polymer-based ophthalmic substrate comprising a polycarbonate polymer, which can also be obtained from Essilor of America, Inc., and has a refractive index of 1.586.

Example 1

Polyvinyl Alcohol Additives

Polyvinyl Alcohol. Polishing slurries 1 and 2 were each made individually by mixing together the amounts of the components shown in weight percent in Table 1, below.

|  | Slurry 1 | Slurry 2 |
| --- | --- | --- |
| Components |  |  |
| Deionized water | 71.7 | 71.7 |
| Alumina | 22 | 22 |
| Aluminum nitrate | 2.8 | 2.8 |
| Aluminum hydroxide | 2.5 | 2.5 |
| Selvol ™ 502 | 0.5 |  |
| Removal Rates |  |  |
| CR-39 | 175 | 177.6 |
| Polycarbonate | 59 | 49.5 |

Slurry 1 is an embodiment of the invention, Slurry 2 is a control. Selvol™ 502 is 87-89% hydrolyzed polyvinyl alcohol solution commercially available from Sekisui Specialty Chemicals, Dallas, Tex. Other levels of hydrolysis and other hydrolyzed polyvinyl alcohol products are suitable. Each slurry was then used to polish the polymer-based ophthalmic substrates shown in the removal rates section. The substrates were polished on a Coburn 505 optical polisher equipped with a bowl-type slurry reservoir. The polishing pad was a Shawsheen 349-7 premium grade yellow polishing pad obtained from PSI of Odessa, Fla. The optical polisher machine settings were 20 psi and 742 RPM. The reservoir was equipped with a small recirculating pump. A fresh 1000 g sample of slurry was prepared for each polishing test. The slurry was recirculated at a flow rate of 4.54 liters/minute. The slurry was chilled throughout each polishing experiment to a temperature range of 10 to 15° C. Efficiency was determined by measuring the weight of each substrate after each polishing cycle and is reported in the above table as weight loss in milligrams per 6-minute cycle. The weight loss values reported were obtained via polishing each substrate three times, and then averaging the weight loss for the three polishing cycles.

Example 2

Tertiary Amide Additives

Examples with Tertiary Amide Containing Additives. Polishing slurries 3 through 6 were each made individually by mixing together the amounts of the components shown in weight percent in the below table.

|  | Slurry 3 | Slurry 4 | Slurry 5 | Slurry 6 |
| --- | --- | --- | --- | --- |
| Components |  |  |  |  |
| Deionized water | 71.7 | 71.7 | 71.7 | 72.7 |
| Alumina | 22 | 22 | 22 | 22 |
| Aluminum nitrate | 2.8 | 2.8 | 2.8 | 2.8 |
| Aluminum hydroxide | 2.5 | 2.5 | 2.5 | 2.5 |
| Aquazol 50 ® | 1 |  |  |  |
| Aquazol 200 ® |  | 1 |  |  |
| Aquazol 500 ® |  |  | 1 |  |
| Removal Rates |  |  |  |  |
| CR-39 | 201 | 202 | 218 | 177.6 |
| Polycarbonate | 68 | 65 | 73 | 49.5 |

Slurries 3-5 are embodiments of the invention, Slurry 6 is a control. The Aquazol ® branded products are poly 2-ethyloxazoline of various molecular weights. Aquazol® is available from Polymer Chemistry Innovations, Inc., of Tucson, Ariz. Aquazol® 50, Aquazol® 200 and Aquazol® 500 have molecular weights of 50,000, 200,000 and 500,000 respectively. Molecular weights in the range of 10,000 to 1 million and 50,000 to 500,000 are suitable as well. The slurry was then used to polish the polymer-based ophthalmic substrates shown in the removal rates section. The substrates were polished on a Coburn 505 optical polisher equipped with a bowl-type slurry reservoir. The polishing pad was a Shawsheen 349-7 premium grade yellow polishing pad obtained from PSI of Odessa, Fla. The optical polisher machine settings were 20 psi and 742 RPM. The reservoir was equipped with a small recirculating pump. A fresh 1000 g sample of slurry was prepared for each polishing test. The slurry was recirculated at a flow rate of 4.54 liters/minute. The slurry was chilled throughout each polishing experiment to a temperature range of 10 to 15° C. Efficiency was determined by measuring the weight loss of each substrate after each polishing cycle and is reported in the above table as weight loss in milligrams per 6-minute cycle. The weight loss values reported were obtained via polishing each substrate three times, and then averaging the weight loss for the three polishing cycles.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. An aqueous dispersion for polishing organic polymer-based ophthalmic substrates comprising:
   5% to about 40% by weight abrasive particles,
   0.1-10% by weight of at least one selected from the group consisting of (a) of a polyvinyl alcohol compound, (b) a tertiary amide compound, and (c) combinations thereof,
   0.25% to 4.0% by weight aluminum nitrate,
   0.5% to about 5% by weight aluminum hydroxide, and deionized water.

2. The aqueous dispersion according to claim 1, wherein the abrasive particles have an average particle size of from about 0.01 to about 5.0 μm.

3. The aqueous dispersion according to claim 2, wherein the abrasive particles are selected from the group consisting of alumina, zirconia, silica, titania, and combinations thereof.

4. The aqueous dispersion according to claim 3, wherein the abrasive particles consist of titania.

5. The aqueous dispersion according to claim 3, wherein the abrasive particles consist of calcined alumina.

6. The aqueous dispersion according to claim 1, further comprising 0.01-0.30% by weight defoamer.

7. The aqueous dispersion according to claim 1, wherein the aqueous dispersion includes the polyvinyl alcohol compound, and the tertiary amide compound.

8. The aqueous dispersion according to claim 1, wherein the aqueous dispersion includes the polyvinyl alcohol compound, and the polyvinyl alcohol compound includes one selected from the group consisting of polyvinyl formate, polyvinyl benzoate, polyvinyl stearate, polyvinyl chloroacetate, polyvinyl fluoroacetate, and polyvinyl propionate.

9. The aqueous dispersion according to claim 1, wherein the aqueous dispersion includes the tertiary amide compound, and the tertiary amide compound includes one selected from the group consisting of poly 2-ethyloxazoline, poly (N,N-dimethylacrylamide), poly (N-methyl N-vinyl acetamide), N-methylcaprolactam, and N-methyl-2-piperidone.

10. The aqueous dispersion according to claim 1, wherein the aqueous dispersion includes the tertiary amide compound, and the tertiary amide compound has a weight average molecular weight of 75,000 to 400,000.

11. A method of polishing an organic polymer-based ophthalmic substrate comprising:
    providing a slurry composition comprising an aqueous dispersion of:
      5% to about 40% by weight abrasive particles,
      0.1-10% by weight of at least one selected from the group consisting of (a) a polyvinyl alcohol compound, (b) a tertiary amide compound, and (c) combinations thereof,
      0.25% to 4.0% by weight aluminum nitrate,
      0.5% to about 5% by weight aluminum hydroxide, and deionized water; and
    disposing the slurry composition between a polishing pad and the organic polymer-based ophthalmic substrate; and
    polishing the organic polymer-based ophthalmic substrate with the polishing pad and the slurry to remove a surface portion of the organic polymer-based ophthalmic substrate.

12. The method according to claim 11, wherein the organic polymer-based ophthalmic substrate is a high index organic polymer-based ophthalmic substrate.

13. The method according to claim 11, wherein the abrasive particles have an average particle size of from about 0.01 to about 5.0 μm.

14. The method according to claim 13, wherein the abrasive particles are selected from the group consisting of alumina, zirconia, silica, titania, and combinations thereof.

15. The method according to claim 14, wherein the abrasive particles consist of titania.

16. The method according to claim 11, further comprising 0.01-0.30% by weight defoamer.

17. The method according to claim 11, wherein the aqueous dispersion includes the polyvinyl alcohol compound, and the tertiary amide compound.

18. The method according to claim 11, wherein the aqueous dispersion includes the polyvinyl alcohol compound, and the polyvinyl alcohol compound includes one selected from the group consisting of polyvinyl formate, polyvinyl benzoate, polyvinyl stearate, polyvinyl chloroacetate, polyvinyl fluoroacetate, and polyvinyl propionate.

19. The method according to claim 11, wherein the aqueous dispersion includes the tertiary amide compound, and the tertiary amide compound includes one selected from the group consisting of poly 2-ethyloxazoline, poly (N,N-dimethylacrylamide), poly (N-methyl N-vinyl acetamide), N-methylcaprolactam, and N-methyl-2-piperidone.

20. The method according to claim 11, wherein the aqueous dispersion includes the tertiary amide compound, and the tertiary amide compound has a weight average molecular weight of 75,000 to 400,000.

* * * * *